United States Patent
Yoshida et al.

(10) Patent No.: US 6,660,071 B2
(45) Date of Patent: Dec. 9, 2003

(54) ELECTROLESS COPPER PLATING BATH, ELECTROLESS COPPER PLATING METHOD AND ELECTRONIC PART

(75) Inventors: Yasushi Yoshida, Yasu-gun (JP); Tatsuo Kunishi, Takefu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 83 days.

(21) Appl. No.: 09/880,335

(22) Filed: Jun. 13, 2001

(65) Prior Publication Data

US 2002/0011176 A1 Jan. 31, 2002

(30) Foreign Application Priority Data

Jun. 19, 2000 (JP) .................................. 2000-183455

(51) Int. Cl.$^7$ ............................................... C23C 18/40
(52) U.S. Cl. ................... 106/1.23; 106/1.26; 427/98; 427/437; 427/443.1
(58) Field of Search ............... 106/1.23, 1.26; 427/98, 437, 443.1

(56) References Cited

U.S. PATENT DOCUMENTS

| | | | | |
|---|---|---|---|---|
| 3,902,907 A | * | 9/1975 | Kishita ....................... 106/1.26 |
| 4,248,633 A | * | 2/1981 | Heijnen et al. ............ 106/1.23 |
| 4,617,205 A | * | 10/1986 | Darken ...................... 427/305 |
| 4,877,450 A | * | 10/1989 | Brasch ....................... 106/1.26 |
| 5,306,336 A | * | 4/1994 | Martyak et al. ........... 106/1.23 |
| 5,419,926 A | * | 5/1995 | Soltys ........................ 427/305 |
| 5,645,628 A | * | 7/1997 | Endo et al. ................ 106/1.23 |
| 5,795,828 A | * | 8/1998 | Endo et al. ................ 438/678 |

FOREIGN PATENT DOCUMENTS

| | | |
|---|---|---|
| DE | 3806306 A1 | 9/1989 |
| DE | 41 11 558 C1 | 1/1992 |
| DE | 4111558 | * 1/1992 |
| DE | 197 40 431 C1 | 11/1998 |
| JP | 63-134670 | 6/1988 |
| JP | 09137277 | * 5/1997 |

OTHER PUBLICATIONS

Derwent abstract of DE 4111558, Jan. 1992.*
Derwent abstract oj JP09/137277, May 1997.*
Copy of German Office Action dated Jun. 4, 2003 (and English translation of relevant portion).

* cited by examiner

Primary Examiner—Helene Klemanski
(74) Attorney, Agent, or Firm—Dickstein, Shapiro, Morin & Oshinsky, L.L.P.

(57) ABSTRACT

An electroless copper plating bath containing a cupric compound, a cupric ion complexing agent, a reducing agent, and a pH adjusting agent is provided, in which a carboxylic acid is added as a reaction accelerator to accelerate the oxidation reaction of the reducing agent. It does not need to use formaldehyde as the reducing agent yet it has a plating reaction velocity which is equivalent to that of a bath in which formaldehyde is contained as the reducing agent.

15 Claims, No Drawings

ELECTROLESS COPPER PLATING BATH, ELECTROLESS COPPER PLATING METHOD AND ELECTRONIC PART

BACKGROUND OF THE INVENTION

1. Field of the Invention

The present invention relates to an electroless copper plating bath. More particularly, the present invention relates to an electroless copper plating bath including no formaldehyde.

2. Description of the Related Art

Electroless plating is commonly applied as a method for forming an electrode with a uniform film thickness on a substrate having an insulating surface, and on substrates of miscellaneous shapes which have through holes, etc. Particularly, among various types of electroless platings, an electroless copper plating is often utilized when a good electroconductivity is required for the electrode.

An electroless copper plating bath usually contains cupric ions, a cupric ion complexing agent, a reducing agent for reducing the cupric ion to deposit copper and a pH adjusting agent. Furthermore, it contains a stabilizer for improving the stability of the plating bath, a surfactant for improving the properties of the plating film, etc. To briefly explain the mechanism of the electroless copper plating, the reducing agent in the plating bath causes an oxidation reaction with a catalytic action of copper, emitting electrons. Subsequently, the cupric ion is reduced by receiving the emitted electrons, depositing a copper plating film on an article to be plated.

In almost all of the industrially utilized electroless copper plating baths, formalin or an aqueous solution of formaldehyde is used as the reducing agent. However, formalin is not desirable from the viewpoint of the working environment, since it is volatile and has a strong odor. Furthermore, there are arguments that it is carcinogenic. Thus formalin has a number of problems.

In consideration of the above-described problems, it was proposed recently to use glyoxylic acid as a reducing agent substituting for formalin in electroless copper plating. Glyoxylic acid has a structure similar to that of formalin, and therefore it is believed that it has an oxidation reaction mechanism similar to that of formalin in the electroless copper plating reactions. Furthermore, there is a report that a copper plating film obtained from an electroless copper plating bath using glyoxylic acid as the reducing agent has properties equivalent to those of the copper plating film obtained from an electroless copper plating bath using formalin.

However, the oxidation reaction of glyoxylic acid proceeds more slowly than that of formalin, though it can be caused by the catalytic action of copper. That is, glyoxylic acid emits fewer electrons from the oxidation reaction, and therefore the plating reaction proceeds more slowly in the electroless copper plating bath using glyoxylic acid as the reducing agent than in the electroless copper plating bath using formalin. As a result, when a copper electrode for an electronic part is formed using the electroless copper plating bath in which glyoxylic acid is added as the reducing agent, the time required for the plating is longer and the production efficiency is lowered. This poses a problem.

SUMMARY OF THE INVENTION

Accordingly, it is an object of the present invention to provide an electroless copper plating bath which does not use the formaldehyde which is not desirable as the reducing agent from the viewpoint of working environment, and which provides a plating reaction velocity on the same level as the plating bath in which formaldehyde is used as the reducing agent.

As a result of studies that had been pursued zealously to solve the above-mentioned problems, it was found through electrochemical polarization measurements that the oxidation reaction of glyoxylic acid with the aid of the catalytic action of copper is accelerated by adding a carboxylic acid to the electroless copper plating bath. Although the details of the reaction mechanism has not been clarified, it is believed as follows: glyoxylic acid tends to be more susceptible to oxidation as the pH is raised; and accordingly, when a carboxylic acid is added to the plating bath, it prevents the pH of the plating bath from decreasing in the vicinity of the interface between copper and glyoxylic acid with the result that the glyoxylic acid becomes more susceptible to the catalytic action of copper, thus emitting electrons more easily.

Therefore, one aspect of the present invention is an electroless copper plating bath containing a cupric compound, a cupric ion complexing agent, a reducing agent, and a pH adjusting agent, in which a carboxylic acid is added as a reaction accelerator to accelerate the oxidation reaction of the above-described reducing agent. The present invention is preferably applied when the above-described reducing agent is a reducing agent other than formaldehyde. It is more preferably applied when the reducing agent is glyoxylic acid.

As explained above, even though a reducing agent such as glyoxylic acid that gives a slower oxidation reaction than formaldehyde is used as a reducing agent for electroless copper plating, a plating velocity on the same level as that in the case in which formaldehyde is used can be obtained by further adding a carboxylic acid.

As a favorable carboxylic acid to be added, enumerated are a monocarboxylic acid selected from the group consisting of glycolic acid, acetic acid and glycine, a dicarboxylic acid selected from the group consisting of oxalic acid, succinic acid, malic acid and malonic acid, as well as a tricarboxylic acid selected from the group consisting of citric acid and nitrilotriacetic acid.

It is preferable that the concentration of the carboxylic acid added to the plating bath is from about 0.01 to 0.2 mol/L. The electroless copper plating can be performed on the surface of a substrate by immersing the substrate into such an electroless copper plating bath as described above, and therefore an electronic part having a substrate with a copper electrode formed thereon can be formed by using the electroless copper plating bath according to the present invention. Furthermore, the present invention can be applied especially favorably when a substrate formed from a ceramic material is subjected to the electroless copper plating.

DESCRIPTION OF THE PREFERRED EMBODIMENTS

The electroless copper plating bath according to the present invention comprises a cupric compound, a cupric ion complexing agent, a reducing agent, a pH adjusting agent and a reaction accelerator to accelerate the reaction of the reducing agent. A surfactant and a stabilizer for improving the stability of the plating bath are also added, as necessary.

Any cupric compound may be used as long as it can supply a cupric ion. Copper (II) sulfate, copper (II) chloride, copper (II) nitrate, etc. can be used, for example. Among them, copper sulfate is the most favorable. By adding such a cupric compound to the plating bath, the cupric ion concentration in the plating bath is adjusted to a value preferably in the range of from about 0.001 to 0.2 mol/L, and more preferably in the range of from about 0.01 to 0.05 mol/L.

As the cupric ion complexing agent, enumerated are Rochelle salt which makes a strongly bonded complex with a cupric ion, ethylenediaminetetraacetic acid, diethylenetriaminepentaacetic acid, etc. Among these complexing agents, ethylenediaminetetraacetic acid and its derivatives are particularly preferable. The long-term stability and the plating film depositing velocity of the plating bath are especially good when such a complexing agent is added. It is noted that the concentration of the complexing agent in the plating bath is adjusted to a value about two to ten times larger than the cupric ion concentration.

When glyoxylic acid is used as the reducing agent, the concentration in the plating bath is adjusted to a value preferably in the range of from about 0.01 to 0.5 mol/L, and more preferably in the range of from about 0.03 to 0.2 mol/L.

As the reaction accelerator, a carboxylic acid is used. A monocarboxylic acid such as glycolic acid, acetic acid or glycine, a dicarboxylic acid such as oxalic acid, succinic acid, malic acid or malonic acid, and a tricarboxylic acid such as citric acid or nitrilotriacetic acid, can be used. Among these carboxylic acids, glycolic acid, succinic acid, and citric acid are especially preferable. The concentration of such a carboxylic acid in the plating bath is also adjusted to a value preferably in the range of from about 0.005 to 0.3 mol/L, and more preferably in the range of from about 0.05 to 0.2 mol/L.

As the stabilizer, a nitrogen-containing compound such as 2,2'-dipyridyl, 1,2,4-benzotriazole, 1,10-phenanthroline, or potassium ferrocyanide, a sulfur-containing compound such as thiourea, thiosulfuric acid or 2-mercaptobenzothiazole, and an iodine-containing compound such as sodium iodide or potassium iodide, can be used.

As the pH adjusting agent, sodium hydroxide, potassium hydroxide, lithium hydroxide, sulfuric acid, hydrochloric acid, etc., can be used. The pH of the plating bath is adjusted to a value preferably in the range of from about 11 to 13.5, and more preferably in the range of from about 12 to 12.7.

Furthermore, a nonionic surfactant, an anionic surfactant, a cationic surfactant or an amphoteric surfactant may be added, as appropriate, for improving the properties of the plating film. The amount of the added surfactant is preferably in the range of from about 0.05 to about 5 g/L.

EXAMPLES

Examples 1 to 5 and Comparative Examples 1 and 2

Electroless copper plating baths (Examples 1 to 5, and Comparative examples 1 and 2) as shown in Table 1 were prepared. Alumina substrates were subjected to cleaning, followed by an activation treatment using a tin chloride solution and a palladium chloride solution. The alumina substrates thus prepared were subjected to electroless copper plating by immersing them into the above-described plating baths. The plating treatments were carried out for one hour with continuously stirring the plating baths using a rotor for the purposes of plating treatment as well as of admitting air into the plating baths simultaneously.

Also, prior to the plating treatments, the oxidation potentials of glyoxylic acid and formalin were measured using an Ag/AgCl electrode in a saturated aqueous potassium chloride solution as a standard. Furthermore, the film thickness and specific resistance measurements were carried out for the plating films formed on the substrates using the plating baths described above. The results are shown in Table 1.

TABLE 1

| | Example 1 | Example 2 | Example 3 | Example 4 | Example 5 | Comp. example 1 | Comp. example 2 |
|---|---|---|---|---|---|---|---|
| Copper sulfate (mol/L) | | | | 0.05 | | | |
| EDTA (mol/L) | | | | 0.1 | | | |
| Reducing agent (mol/L) | | | Glyoxylic acid 0.1 | | | | Formalin 0.04 |
| Reaction accelerator (mol/L) | Glycolic acid 0.1 | Acetic acid 0.1 | Oxalic acid 0.1 | Succinic acid 0.1 | Citric acid 0.1 | | |
| 2,2'-dipyridyl (mol/L) | | | | 10 | | | |
| pH | | | 12.5 (Adjusted with NaOH) | | | | |
| Bath temp. (° C.) | | | | 65 | | | |
| Oxidation potential (V) | −0.80 | −0.82 | −0.82 | −0.83 | −0.81 | −0.72 | −0.82 |
| Plating film thickness (μm) | 2.6 | 2.7 | 2.6 | 2.7 | 2.6 | 2.0 | 2.7 |
| Specific resistance (μΩ · cm) | 2.0 | 2.1 | 2.1 | 2.0 | 2.0 | 2.1 | 2.0 |

Examples 1 to 5 and Comparative example 1 represent plating baths in which glyoxylic acid was used as the reducing agent. Comparative example 2 represents a plating bath in which formalin was used as the reducing agent. As is evident from Table 1, among the plating baths in which glyoxylic acid was used as the reducing agent, Examples 1 to 5 in which carboxylic acids were added had oxidation potentials of glyoxylic acid shifted to a baser level than that of the oxidation potential of Comparative example 1 in which a carboxylic acid was not added. This indicates that the oxidation reaction of glyoxylic acid was accelerated when a carboxylic acid was added. It is also understood that the oxidation potential was equivalent to that of formalin which was added to Comparative example 2 as the reducing agent.

of glyoxylic acid was measured prior to the plating treatments, and the film thickness and specific resistance measurements were carried out for the plating films formed on the substrates using the plating baths described above. The results are shown in Table 2.

TABLE 2

|  | Comp. example 3 | Example 6 | Example 7 | Example 8 | Example 9 | Example 10 |
| --- | --- | --- | --- | --- | --- | --- |
| Copper sulfate (mol/L) |  |  | 0.05 |  |  |  |
| EDTA (mol/L) |  |  | 0.1 |  |  |  |
| Reducing agent (glyoxylic acid) (mol/L) |  |  | 0.1 |  |  |  |
| Reaction accelerator (glycolic acid) (mol/L) |  | 0.001 | 0.01 | 0.05 | 0.2 | 0.5 |
| 2,2'-dipyridyl (mol/L) |  |  | 10 |  |  |  |
| pH |  |  | 12.5 (Adjusted with NaOH) |  |  |  |
| Bath temp. (° C.) |  |  | 65 |  |  |  |
| Oxidation potential (V) | −0.72 | −0.72 | −0.73 | −0.79 | −0.82 | −0.82 |
| Plating film thickness ($\mu$m) | 2.1 | 2.1 | 2.2 | 2.4 | 2.7 | 2.7 |
| Specific resistance ($\mu\Omega \cdot$ cm) | 2.1 | 2.1 | 2.1 | 2.1 | 2.2 | 2.6 |

As a result of plating treatments using these plating baths for one hour, the plating film deposited in Comparative example 1 in which a carboxylic acid was not added had a film thickness of 2.0 $\mu$m. In comparison, the plating films of Example 1 to 5 in which carboxylic acids were added had film thicknesses in the range of from 2.6 to 2.7 $\mu$m, which were equivalent to that of the plating film obtained from Comparative example 2 in which formalin was used. Accordingly, it is understood that a plating velocity which was equivalent to that of the bath in which formalin was used as the reducing agent was realized by the acceleration of the oxidation reaction of glyoxylic acid, as described above.

Furthermore, the specific resistances of the plating films obtained from Examples 1 to 5 in which carboxylic acids were added were on the same level as that of the plating film obtained from Comparative example 2 in which formalin was used, indicating that the plating films were of good quality, without showing any symptom of degraded plating film properties.

Examples 6 to 10 and Comparative Example 3

The electroless copper plating baths (Examples 6 to 10 and Comparative example 3) shown in Table 2 were prepared, and electroless copper plating was carried out by immersing substrates in these baths. In these Examples and in the Comparative example, glyoxylic acid was used as the reducing agent, and in the Examples glycolic acid was used as a carboxylic acid acting as the reaction accelerator. Explanations on the substrates and the plating treatment method applied are omitted as they are the same as those in the cases of Examples 1 to 5 and Comparative examples 1 and 2.

According to the same method as that in Examples 1 to 5 and Comparative examples 1 and 2, the oxidation potential Examples 6 to 10 represent plating baths in which the amount of added glycolic acid was varied. Comparative example 3 represents a plating bath in which glycolic acid was not added. As is evident from Table 2, as the amount of added glycolic acid was increased, the oxidation potential of glyoxylic acid was shifted to a baser level, by which it is confirmed that the oxidation reaction of glyoxylic acid was accelerated.

Furthermore, plating treatments were carried out using these baths for one hour. From the results, it is understood that the film thickness of the deposited plating film was increased with an increase in the amount of added glycolic acid. Accordingly, it is understood that the copper depositing velocity was accelerated as the oxidation reaction of glyoxylic acid was accelerated by the addition of glycolic acid as described above.

Furthermore, a shift in the oxidation potential and an increase in the thickness of the plating film were not confirmed in Example 6 in which the amount of added glycolic acid was 0.001 mol/L. Therefore, it is considered to be desirable that the amount of added glycolic acid be not less than about 0.01 mol/L to accelerate the reaction of glyoxylic acid.

Also in Example 10 in which the amount of added glycolic acid was 0.05 mol/L, the specific resistance of the plating film obtained was larger than that of the plating film of the above-described Comparative example 2 in which formalin was used as the reducing agent, indicating degradation of the film properties, although it had a large film thickness. Therefore, it is considered to be desirable that the amount of added glycolic acid be not more than about 0.2 mol/L.

Examples 11 to 15 and Comparative Example 4

The electroless copper plating baths (Examples 11 to 15 and Comparative example 4) shown in Table 3 were prepared, and electroless copper plating was carried out by immersing substrates in these baths. In these Examples and in the Comparative example, glyoxylic acid was used as the reducing agent, and in the Examples citric acid was added as the reaction accelerator. Explanations on the substrates and the plating treatment method applied are omitted as they are the same as those in the cases of Examples 1 to 5, and Comparative examples 1 and 2.

According to the same method as that in Examples 1 to 5 and Comparative examples 1 and 2, the oxidation potential of glyoxylic acid was measured prior to the plating treatments, and the film thickness and specific resistance measurements were carried out for the plating films formed on the substrates using the plating baths described above. The results are shown in Table 3.

TABLE 3

|  | Comp. example 4 | Example 11 | Example 12 | Example 13 | Example 14 | Example 15 |
| --- | --- | --- | --- | --- | --- | --- |
| Copper sulfate (mol/L) | | | 0.05 | | | |
| EDTA (mol/L) | | | 0.1 | | | |
| Reducing agent (glyoxylic acid) (mol/L) | | | 0.1 | | | |
| Reaction accelerator (citric acid) (mol/L) | | 0.001 | 0.01 | 0.05 | 0.2 | 0.5 |
| 2,2'-dipyridyl (mol/L) | | | 10 | | | |
| pH | | | 12.5 (Adjusted with NaOH) | | | |
| Bath temp. (° C.) | | | 65 | | | |
| Oxidation potential (V) | −0.72 | −0.72 | −0.74 | −0.81 | −0.82 | −0.82 |
| Plating film thickness ($\mu$m) | 2.1 | 2.1 | 2.2 | 2.6 | 2.7 | 2.7 |
| Specific resistance ($\mu\Omega \cdot$ cm) | 2.1 | 2.2 | 2.2 | 2.0 | 2.4 | 2.5 |

Examples 11 to 15 represent plating baths in which the amount of added citric acid was varied. Comparative example 4 represents a plating bath in which citric acid was not added. In these Examples in which citric acid was added, as the amount of added citric acid was increased, the oxidation reaction of glyoxylic acid showed a tendency of being accelerated, as in the cases of the above-described Examples 6 to 10 in which glycolic acid was added. Furthermore, as in the cases of the above-described Examples 6 to 10, it is considered to be desirable that the amount of added citric acid be in the range of from about 0.01 to 0.2 mol/L based on the film thicknesses and the specific resistance values of plating films.

It is noted that the carboxylic acids added in the present invention indicate the carboxylic acids added to the plating baths prior to the plating treatments, but not the carboxylic acids generated from the reducing agents consumed in the course of the plating reactions.

An electronic part having a substrate with a copper electrode as an external electrode thereon can be manufactured by performing electroless copper plating in which the substrate is immersed in an electroless copper plating bath according to the present invention. Furthermore, the electroless copper plating bath according to the present invention can be used in an alkaline region. Therefore, even when an external electrode is formed on an electronic part having a substrate made of a ceramic material, there is no need of worrying about a corrosion problem of the substrate. Accordingly, the present invention can be applied to the electronic parts in general including a dielectric resonator.

As described above, the present invention can provide an electroless copper plating bath which does not use, as the reducing agent, formaldehyde which is not desirable from the viewpoint of working environment, and yet has a plating reaction velocity which is on the equivalent level as that of a bath in which formalin is used, by adding a carboxylic acid as a reaction accelerator of the reducing agent.

What is claimed is:

1. An electroless copper plating bath comprising:
   a cupric compound;
   a cupric ion complexing agent;
   a reducing agent which is glyoxylic acid;
   a pH adjusting agent; and
   an oxidation reaction accelerator which is a carboxylic acid other than said glyoxylic acid.

2. An electroless copper plating bath according to claim 1, which is free of formaldehyde.

3. An electroless copper plating bath according to claim 2, wherein said carboxylic acid is a monocarboxylic acid selected from the group consisting of glycolic acid, acetic acid, and glycine.

4. An electroless copper plating bath according to claim 2, wherein said carboxylic acid is a dicarboxylic acid selected from the group consisting of oxalic acid, succinic acid, malic acid, and malonic acid.

5. An electroless copper plating bath according to claim 2, wherein said carboxylic acid is a tricarboxylic acid selected from the group consisting of citric acid and nitrilotriacetic acid.

6. An electroless copper plating bath according to claim 2, wherein the concentration of said carboxylic acid is from 0.01 to 0.2 mol/L.

7. An electroless copper plating bath according to claim 6, wherein the concentration of said cupric compound is about 0.001 to 0.2 mol/l, the concentration of said cupric ion complexing agent is about 2 to 10 times the cupric compound concentration, the concentration of glyoxylic acid is about 0.01 to 0.5 mol/l and the pH is about 11–13.5.

8. An electroless copper plating bath according to claim 7, wherein the concentration of said cupric compound is about 0.01 to 0.05 mol/l, the concentration of glyoxylic acid is about 0.03 to 0.2 mol/l and the pH is about 12–12.7.

9. In an electroless copper plating method comprising immersing a substrate into an electroless copper plating bath so as to provide electroless copper plating on to the surface of the substrate, the improvement which comprises utilizing the electroless copper plating bath according to claim 8.

10. In an electroless copper plating method comprising immersing a substrate into an electroless copper plating bath so as to provide electroless copper plating on to the surface of the substrate, the improvement which comprises utilizing the electroless copper plating bath according to claim 6.

11. In an electroless copper plating method comprising immersing a substrate into an electroless copper plating bath so as to provide electroless copper plating on to the surface of the substrate, the improvement which comprises utilizing the electroless copper plating bath according to claim 2.

12. In an electroless copper plating method comprising immersing a substrate into an electroless copper plating bath so as to provide electroless copper plating on to the surface of the substrate, the improvement which comprises utilizing the electroless copper plating bath according to claim 1.

13. An electroless copper plating method according to claim 12, wherein said substrate comprises a ceramic material.

14. An electronic part having a substrate with a copper electrode formed thereon, wherein said copper electrode is formed by applying an electroless copper plating method according to claim 9.

15. An electronic part according to claim 14, said substrate comprises a ceramic material.

* * * * *